(12) United States Patent
Diggins et al.

(10) Patent No.: US 8,462,170 B2
(45) Date of Patent: Jun. 11, 2013

(54) PICTURE ATTRIBUTE ALLOCATION

(75) Inventors: Jonathan Diggins, Hampshire (GB); Michael James Knee, Hants (GB)

(73) Assignee: Snell Limited, Havant, Hants (GB)

( * ) Notice: Subject to any disclaimer, the term of this patent is extended or adjusted under 35 U.S.C. 154(b) by 655 days.

(21) Appl. No.: 12/307,528

(22) PCT Filed: Jul. 20, 2007

(86) PCT No.: PCT/GB2007/002809
§ 371 (c)(1),
(2), (4) Date: Aug. 26, 2009

(87) PCT Pub. No.: WO2008/048695
PCT Pub. Date: Jan. 24, 2008

(65) Prior Publication Data
US 2010/0045693 A1    Feb. 25, 2010

(30) Foreign Application Priority Data
Jul. 21, 2006   (GB) .................................. 0614567.6

(51) Int. Cl.
*G09G 5/02* (2006.01)

(52) U.S. Cl.
USPC ........... 345/589; 345/581; 345/597; 345/598; 345/599; 382/107; 382/154; 382/197; 382/253; 348/402.1; 348/413.1; 348/416.1; 348/700

(58) Field of Classification Search
USPC .................. 345/581, 589, 597–599; 382/107, 382/154, 197, 253; 348/402.1, 413.1, 416.1, 348/700
See application file for complete search history.

(56) References Cited

U.S. PATENT DOCUMENTS

| 4,991,020 A | * | 2/1991 | Zwirn | 348/563 |
| 5,241,608 A | * | 8/1993 | Fogel | 382/107 |

(Continued)

FOREIGN PATENT DOCUMENTS

| JP | 5219529 | 8/1993 |
| JP | 2000224593 | 8/2000 |
| WO | 01/48695 | 7/2001 |
| WO | 01/56268 | 8/2001 |

OTHER PUBLICATIONS

Peters, H., et al., "Application Specific Instruction-Set Processor Template for Motion Estimation in Video Applications", IEEE Transactions on Circuits and Systems for Video Technology, IEEE Service Center, Piscataway, NJ, US, vol. 15, No. 4, Apr. 2005, pp. 508-527, XP011129237, ISSN: 1051-8215.
PCT/GB2007/002809 International Preliminary Report on Patentability, 11 pages, Dated Feb. 5, 2009.
Office Action from the Japanese Patent Office for Application No. 2009-521334 dated Feb. 22, 2012 (English Translation and Original, 5 pages).

*Primary Examiner* — Xiao M. Wu
*Assistant Examiner* — Todd Buttram
(74) *Attorney, Agent, or Firm* — Michael Best & Friedrich LLP

(57) ABSTRACT

The invention concerns image processing and, in particular, the processing of picture attribute fields for an image. A method of obtaining a new picture attribute field of an image is disclosed in which a picture attribute value at one position is allocated to a new position in the image in dependence upon the value of a parameter, such as luminance data, at the original position and at the new position and/or in dependence on the distance between the original position and the new position. The invention may be used to process picture attribute fields comprising: motion vectors; motion vector confidence; segment labels; depth labels; texture labels.

12 Claims, 2 Drawing Sheets

× Required Vector Locations

● Source Vector Locations

U.S. PATENT DOCUMENTS

| | | |
|---|---|---|
| 6,556,704 B1 | 4/2003 | Chen |
| 2003/0215016 A1 | 11/2003 | Nishibori et al. |
| 2006/0164559 A1* | 7/2006 | Chou et al. .................... 348/700 |
| 2006/0197868 A1 | 9/2006 | Ogo |

* cited by examiner

× Required Vector Locations

● Source Vector Locations

PICTURE ATTRIBUTE ALLOCATION

CROSS-REFERENCE TO RELATED APPLICATIONS

This patent application is a national stage filing under 35 U.S.C. 371 of International Application No. PCT/GB2007/002809, filed Jul. 20, 2007, which claims foreign priority to Great Britain Patent Application No. 0614567.6, filed Jul. 21, 2006, the disclosures of which are incorporated by reference herein in their entireties. Priority to each application is hereby claimed The invention relates to image processing and, in particular, concerns the processing of picture attribute fields for an image. In one embodiment the picture attribute field is a motion vector field for an image in a sequence of images, where the vectors describe the changes in the positions of features portrayed in the images between successive images in the sequence.

The use of motion vectors in the processing of sequences of images such as film frames or video fields is widespread. Motion vectors are used in standards conversion, e.g. temporal sample rate conversion and de-interlacing, and other processes such as noise reduction. Almost invariably the images are spatially sampled on a pixel raster and each pixel is represented by one or more numerical values representative of its luminance and/or chromaticity.

Known methods of deriving motion vectors for a sequence of images include Block Matching and Phase Correlation. In Block Matching one or more contiguous pixels from a position within a first image in the sequence are compared with pixels at various positions in a second image from the sequence, and the position of minimum pixel value difference, i.e. closest match, is established. The second image may occur before or after the first image in the sequence of images. A motion vector is created to describe the displacement between the pixel or group of pixels in the first image and the matching pixel or group of pixels in the second image. This vector is then associated with the compared pixel or pixels.

In Phase Correlation the images are divided into blocks of pixels and a two-dimensional Fourier transform is applied to each block. The phase differences between respective spatial frequency components of co-located blocks in successive images of the sequence are evaluated to determine the changes in the positions of image features from one image to the next. These phase differences can be used to calculate motion vectors. Phase Correlation has the advantage over Block Matching that more than one direction of motion can be determined from a single block of pixels; for example there may be two, differently moving, objects portrayed within the block.

Regardless of the way the motion vectors are determined each vector will always be associated with a particular pixel, group of pixels or block. This means that the set of vectors derived from an image will be spatially sampled; and, because it is unusual to derive a vector from every pixel, the spatial resolution of the vector field is usually lower than the spatial resolution of the image to which it refers.

In many image processing tasks it is helpful to have access to a motion vector field where the spatial sampling of the vectors is different from the inherent sampling pattern of the motion estimation process used to derive the vectors. For example there may be a need for at least one vector for every pixel (where the vectors are derived from blocks of pixels); or, appropriate vectors may be needed for resampling, decimating or interpolating the image to a sampling raster different from that on which it was received.

More generally, it may be helpful to have access to a field of any picture attribute having a new spatial sampling of the picture attribute different from a previous spatial sampling of the picture attribute.

The invention consists in one aspect of a method and apparatus for obtaining a new picture attribute field of an image from an existing picture attribute field of the image and a pixel colorimetric parameter field of the image, comprising the step of, for one or more new positions in the image, allocating a picture attribute value at an originally associated position to the new position in the image in dependence upon the value of a pixel colorimetric parameter at the originally associated position and the value of said pixel colorimetric parameter at the new position.

The step of allocating the picture attribute value may depend upon the distance between the new position and the originally associated position.

In one embodiment, the allocation depends on a weighted sum of a distance parameter and a pixel colorimetric value difference. The picture attribute values at the originally associated location corresponding to the minimum value of the said weighted sum may be allocated to the said new position.

In a second aspect of the invention there is provided a method of spatially interpolating a picture attribute field of an image whereby one or more picture attribute values are allocated to new positions in the said image in dependence upon the distance between the new position and the originally associated position.

The picture attribute value at an originally associated position nearest to the new position may be allocated to the new position. The allocation may depend upon the square of the said distance.

The value of the pixel colorimetric parameter at the new position and/or at the originally associated position may be determined by spatial interpolation of the pixel colorimetric parameter field of the image.

In certain embodiments the spatial sampling frequency of the picture attribute field is increased.

In other embodiments the spatial sampling frequency of the picture attribute field is decreased.

The picture attribute may be one of: motion vectors; motion vector confidence; segment labels; depth labels; texture labels. In general the picture attribute may be any piecewise continuous attribute i.e. a quantity that would be expected to have discontinuities in its values corresponding to different image structures or properties of portrayed objects. The picture attribute may be regarded as non-viewable in the sense that the picture attribute values are distinguished from the pixel values which form the viewable image.

The invention also relates to a computer program product comprising code adapted to implement a method in accordance with the invention.

An example of the invention will now be described with reference to the drawings in which.

The invention will now be described with reference to a motion vector field. However, the skilled person will recognise that the invention may be applied equally to other picture attribute fields associated with an image. Picture attributes that may give rise to a picture attribute field for an image are exemplified by, but not limited to: texture labels; segment labels; depth estimates; motion vectors; and motion vector confidence measures. The creation of such picture attribute field will be familiar to a skilled person and will not be explained in more detail herein. As with the motion vector field discussed herein, in many image processing tasks it is helpful to have access to fields of these picture attributes at a spatial sampling pattern different from an original spatial sampling pattern.

Although the following description relates to motion vectors within an image sequence, the invention may also be applied to picture attributes in a single image.

Where a sequence of images portrays uniform motion, for example a camera pan across a stationary background, the motion vector field derived between a pair of images in the sequence is substantially uniform. That is to say that the motion vectors derived at different, but closely spaced, positions within the image are substantially similar. Therefore if a motion vector is required at a particular position in the image it is possible to use a vector from a nearby point without significant error.

Figure 1:
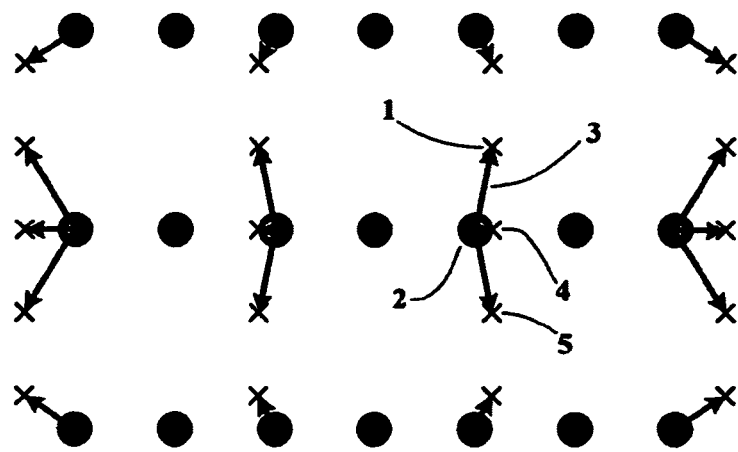
FIG. 1 shows the use of motion vectors at a number of pixel positions which are different from the positions for which vectors are available.

FIG. 1 shows an example of the application of this principle. In the Figure the locations where vectors are required are marked by crosses and the locations at which vectors are available are marked by circles. The arrows show the closest available vector location for each location at which a vector is required. For example the point (1), for which a vector is required, is closest to the point (2), at which a vector is available. The available vector from point (2) is thus used at the point (1) and this is indicated in the Figure by the arrow (3). The points (4) and (5) are also closer to the point (2) than any other point at which a vector is available, and so the vector from point (2) is also used at these points.

This technique can be used for either increasing or decreasing the spatial sampling frequency of the vector field. (In the example of FIG. 1 the field is up-sampled vertically and down-sampled horizontally.)

Where different parts of the image are moving at different speeds, for example where a number of independently moving objects are portrayed, the vector field will be non-uniform and the method of FIG. 1 will be prone to errors when vectors relating to one moving object are used in image areas corresponding to other, nearby objects.

This difficulty can be overcome by a system in which the luminance (or another colorimetric parameter) of the pixels is used in the choice of available vectors. Such a system is shown in FIG. 2.

In the following description, both distance and a pixel colorimetric parameter are used in the choice of vector to allocate to the new position. However, it is not necessary in all embodiments to use distance and the choice of vector to allocate to the new position may be made solely of the basis of pixel colorimetric parameters, as will be explained below.

Figure 2:
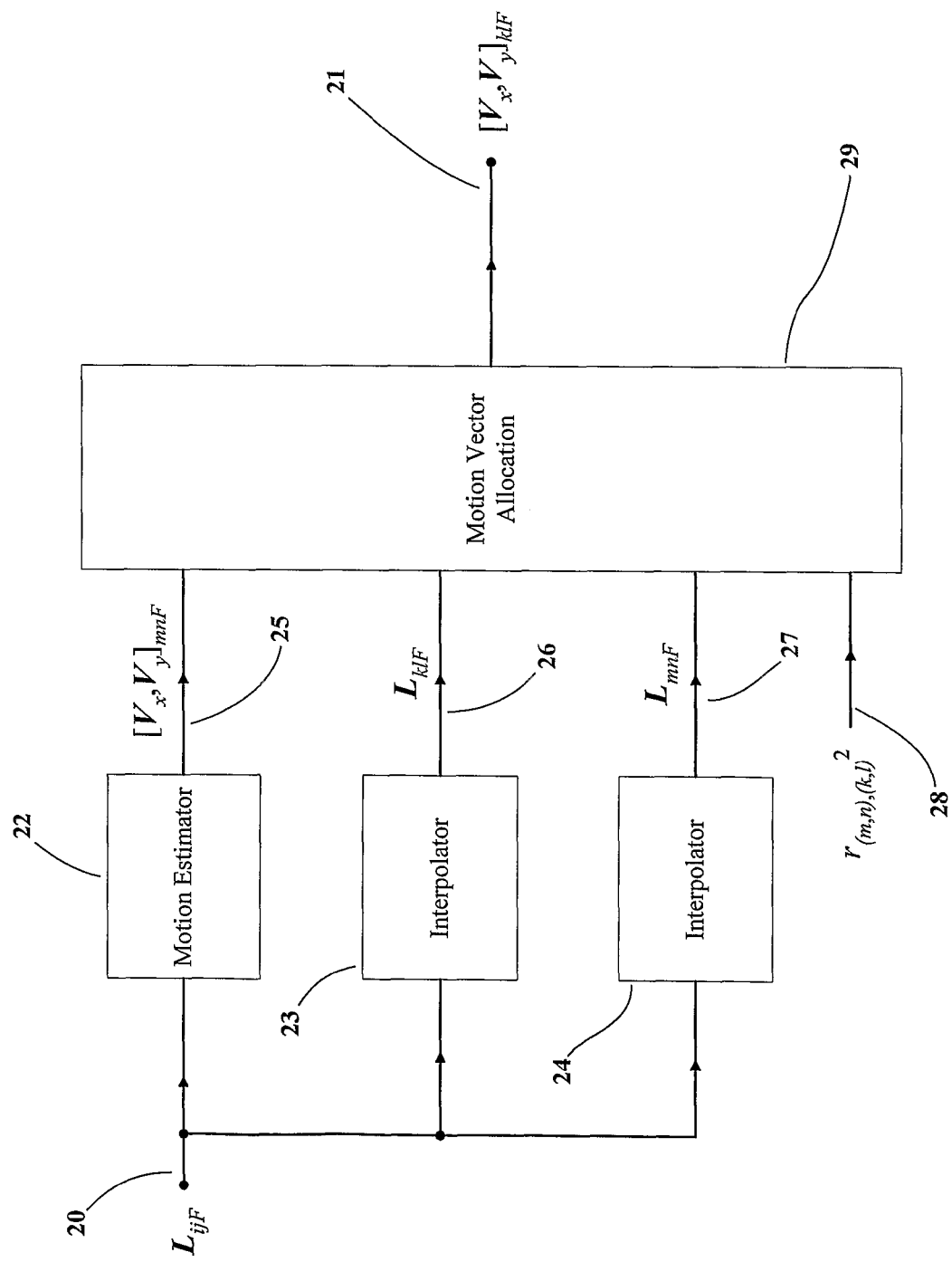
FIG. 2 shows a block diagram of a motion vector interpolator in accordance with an embodiment of the information.

In FIG. 2 a set of pixel colorimetric parameter values $L_{ijF}$ (20) from a sequence of images are used to produce a set of output motion vectors $[V_x,V_y]_{klF}$ (21). The parameter values $L_{ijF}$ would typically be the luminance values of pixels of image F of the sequence at positions in the scanning raster defined by respective horizontal and vertical coordinates i and j. The set of output vectors $[V_x,V_y]_{klF}$ are associated with image positions defined by respective horizontal and vertical coordinates k and l in the scanning raster for which vectors are required.

A motion estimator (22) compares successive images of the sequence and generates sets of motion vectors $[V_x,V_y]_{mnF}$ (25) for some or all of the images by any of the known motion estimation techniques. These vectors correspond to positions in the image defined by respective horizontal and vertical coordinates m and n. Typically the set of coordinate positions m, n would be the centres of blocks of pixels used by the motion estimator (22) to compute the vectors. The coordinate positions m, n need not necessarily correspond with any of the pixels (20) and there may be more than one vector associated with each coordinate position.

An interpolator (23) computes colorimetric parameter values $L_{klF}$ (26) from the input parameter values (20), where the respective horizontal and vertical coordinates k and/represent locations at which the output motion vectors (21) are required. The interpolator (23) can use any of the known techniques of spatial interpolation or decimation to obtain values of the colorimetric parameter L at locations other than those of the input values $L_{ijF}$ (20). Such methods include linear and non-linear filters which may or may not be variables-separable.

A second interpolator (24) computes colorimetric parameter values $L_{mnF}$ (27) from the input parameter values (20), where the respective horizontal and vertical coordinates m and n represent locations which correspond to the positions of the motion vectors (25) from the motion estimator (22). The interpolator (24) can operate in the same way as the interpolator (23) or use some other known spatial interpolation or decimation technique.

The skilled person will appreciate that it is not always necessary to interpolate both colorimetric parameter values $L_{klF}$ (26) and colorimetric parameter values $L_{mnF}$ (27), as one or both of these pixel colorimetric parameter values may correspond to pixel colorimetric parameter values $L_{ijF}$ (20). In addition interpolators (23,24) are shown separately, but any functionally equivalent arrangement may be used.

The output motion vectors $[V_x,V_y]_{klF}$ (21) are determined by a motion vector allocation block (29) which allocates the motion vectors $[V_x,V_y]_{mnF}$ (25) to the required output coordinate positions k,l in dependence upon Euclidean inter-pixel distances and colorimetric parameter value differences. (In FIG. 1 the length of the arrow (3) represents the Euclidean distance between the required sample position (1) and the available vector location (2)).

Vectors are allocated by finding the vector having the lowest value of an 'allocation parameter', the allocation parameter being based on the location for which the vector was determined and the required output vector position and the difference between the value of the colorimetric parameter at these two locations.

The allocation parameter is defined as follows:

$$D[(m,n),(k,l)] = w_1 \cdot r_{(m,n),(k,l)}^2 + w_2 \cdot |L_{mn} - L_{kl}|$$

Where: $r_{(m,n),(k,j)}$ is the Euclidean distance between the available vector position (m,n) and the required output vector position (k,l); and, $w_1$ and $w_2$ are weighting factors.

In one embodiment $w_2$ is twenty times greater than $w_1$·, in the case where Euclidean distances are measured on the grid of input pixels and colorimetric parameter values are expressed as 8-bit integers.

In one embodiment $w_1$ is zero and the allocation parameter depends only on the colorimetric parameter at the two locations.

In FIG. 2 all the values of $r_{(m,n),(k,l)}^2$ are pre-calculated (from knowledge of the required output vector positions and knowledge of the methods used by motion estimator (22)) and input, at terminal (28), to the vector allocation block (29). The block (29) also receives the colorimetric values $L_{klF}$ (26) and $L_{mnF}$ (27) and can therefore determine the allocation parameter D[(m,n),(l,f)] for each required output vector position (k,l) according to the above equation. In practice not all the modified distances need be calculated and it may be helpful to limit the calculation to a region encompassing the relevant input and output pixel positions.

For each required output vector position (k,l), the vector location (m,n) having the lowest modified allocation parameter D[(m,n),(k,l)] is found. The corresponding vector $[V_x, V_y]_{mnF}$ calculated by the motion estimator (22) for the location (m,n) is allocated to the output vector location (k,l) by the motion vector allocation block (29) and output at terminal (21). If the motion estimator (22) generates more than one vector for a particular location (m,n) then all of the vectors from that location are allocated to the chosen output vector location (k,l). In the event that two or more vector locations yield the same lowest modified distance value, any known technique could be used to calculate a single output vector. For example, a choice could be made at random, or an average of motion vector values could be taken, or the vector location having either the lowest Euclidean distance or the lowest colorimetric parameter value difference.

The invention has been described by way of example and other embodiments are possible. For example, colorimetric parameters other than luminance, such as hue, saturation or colour component values (e.g. Red Green or Blue) could be used instead of luminance.

Typically, the invention may be carried out on picture attribute fields for a video data stream. However, the invention may also be applied to the processing of picture attribute fields for files of video data and in some embodiments to the processing of a picture attribute field of a single image.

As will be apparent to a skilled person, the described invention may be implemented in both hardware and software as seems appropriate to a skilled person.

Although illustrated and described above with reference to certain embodiments, the present invention is nevertheless not intended to be limited to the details shown. Rather various modifications may be made without departing from the invention defined by the appended claims.

The invention claimed is:

1. A method of obtaining a new picture attribute field of an image from an existing picture attribute field of the image and a pixel colorimetric parameter field of the image, the method comprising the steps of, receiving an image, by a processor, having one or more picture attribute values each associated with said image at an originally associated position in said image, said originally associated positions representing a first sampling frequency; for one or more new positions in the image representing a second sampling frequency different from said first sampling frequency, allocating said picture attribute value at an originally associated position to the new position in the image in dependence upon the value of a pixel colorimetric parameter at the originally associated position $L_{original}$ and the value of said pixel colorimetric parameter at the new position in said image $L_{new}$ and optionally in dependence upon the distance between the new position and the originally associated position, in which the allocation depends on a weighted sum D of a distance parameter r and a pixel colorimetric value difference $L_{original}-L_{new}$; and outputting the image with each picture attribute value associated therewith at said new position; where $$D = w_1 \cdot r^2 + w_2 \cdot |L_{original} - L_{new}|$$

where $w_1$ and $w_2$ are weighting factors where $w_1$ may take the value zero and $w_2$ is always non-zero.

2. A method according to claim 1 in which the picture attribute value at the originally associated location corresponding to the minimum value of the said weighted sum is allocated to the said new position.

3. The method according to claim 1 further comprising the step of determining the value of the pixel colorimetric parameter at the new position by spatial interpolation of the pixel colorimetric parameter field of the image.

4. The method according to claim 1 further comprising the step of determining the value of the pixel colorimetric parameter at the originally associated position by spatial interpolation of the pixel colorimetric parameter field of the image.

5. A method according to claim 1 in which a spatial sampling frequency of the picture attribute field is increased.

6. A method according to claim 1 in which a spatial sampling frequency of the picture attribute field is decreased.

7. A method according to claim 1 where the picture attribute value is one of: motion vectors; motion vector confidence; segment labels; depth labels; texture labels.

8. A method, for an image which comprises pixel values $L_{ij}$ at pixel locations [i,j] and which has motion vector values $V_{mn}$ at a first set of locations [m,n] in the image, of providing motion vector values $V_{kl}$ at a second set of locations [k,l] in the same image, wherein the first set of locations [m,n] and the second set of locations [k,l] represent respective different motion vector sampling frequencies, the method comprising the steps of obtaining, by a processor, pixel values $L_{mn}$ at locations [m,n]; obtaining pixel values $L_{kl}$ at locations [k,l] in the same image; selecting for a particular location [k,l] a corresponding location [m,n] through comparison of pixel values $L_{mn}$ with pixel values $L_{kl}$; and allocating to the location [k,l] the motion vector value $V_{mn}$ from said corresponding location [m,n] to provide the motion vector value $V_{kl}$ in accordance with an allocation parameter $D[(m,n),(k,l)]$ defined as follows:

$$D[(m,n),(k,l)] = w_1 \cdot r_{(m,n),(k,l)}^2 + w_2 \cdot |L_{mn} - L_{kl}|$$

where: $r_{(m,n),(k,l)}$ is the Euclidean distance between the available vector position (m,n) and the required output vector position (k,l); and $w_1$ and $w_2$ are weighting factors where $w_1$ may take the value zero and $w_2$ is always non-zero.

9. A method according to claim 8, wherein the step of selecting for a particular location [k,l] a corresponding location [m,n], comprises the step of minimising said allocation parameter $D_{mn,kl}$.

10. A method according to claim 8, wherein the pixel values $L_{mn}$ are obtained by interpolation from the pixel values $L_{ij}$.

11. A method according to claim 8, wherein the pixel values $L_{kl}$ are obtained by interpolation from the pixel values $L_{ij}$.

12. A non-transitory computer program product comprising code adapted to implement a method of obtaining a new picture attribute field of an image from an existing picture attribute field of the image and a pixel colorimetric parameter field of the image, comprising the steps of, receiving an image having one or more picture attribute values each associated with said image at an originally associated position in said image, said originally associated positions representing a first sampling frequency; for one or more new positions in the image representing a second sampling frequency different from said first sampling frequency, allocating said picture attribute value at an originally associated position to the new position in the image in dependence upon the value of a pixel colorimetric parameter at the originally associated position $L_{original}$ original and the value of said pixel colorimetric parameter at the new position in said image $L_{new}$ and optionally in dependence upon the distance between the new position and the originally associated position, in which the allocation depends on a weighted sum D of a distance parameter r and a pixel colorimetric value difference $L_{original}-L_{new}$; and outputting the image with each picture attribute value associated therewith at said new position; where $$D = w_1 \cdot r^2 + w_2 \cdot |L_{original} - L_{new}|$$

where $w_1$ and $w_2$ are weighting factors where $w_1$ ma take the value zero and $w_2$ is always non-zero.

* * * * *

UNITED STATES PATENT AND TRADEMARK OFFICE
CERTIFICATE OF CORRECTION

PATENT NO. : 8,462,170 B2  
APPLICATION NO. : 12/307528  
DATED : June 11, 2013  
INVENTOR(S) : Jonathan Diggins and Michael James Knee Page 1 of 1

It is certified that error appears in the above-identified patent and that said Letters Patent is hereby corrected as shown below:

In the Claims

Column 6, line 63: replace the word "ma" with the word --may--

Signed and Sealed this
Eighth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,462,170 B2  Page 1 of 1
APPLICATION NO. : 12/307528
DATED : June 11, 2013
INVENTOR(S) : Diggins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this
Eighth Day of September, 2015

Michelle K. Lee
*Director of the United States Patent and Trademark Office*